United States Patent [19]
Ishikawa et al.

[11] 3,909,082
[45] Sept. 30, 1975

[54] MAGNETIC BEARING DEVICES

[75] Inventors: Hiroaki Ishikawa; Makio Sei; Isamu Eguchi, all of Hitachi, Japan

[73] Assignee: Hitachi, Ltd., Japan

[22] Filed: Aug. 30, 1973

[21] Appl. No.: 393,194

[30] Foreign Application Priority Data
Aug. 30, 1972 Japan.................................. 47-86174
Dec. 11, 1972 Japan.............................. 47-123359

[52] U.S. Cl. ................................................. 308/10
[51] Int. Cl.² ........................................ F16C 39/00
[58] Field of Search ..................... 308/10; 74/5, 5.6

[56] References Cited
UNITED STATES PATENTS

| | | | |
|---|---|---|---|
| 2,747,944 | 5/1956 | Baermann | 308/10 |
| 3,356,425 | 12/1967 | Carriere | 308/10 |
| 3,357,756 | 12/1967 | Fehr | 308/10 |
| 3,434,084 | 3/1969 | Milligan | 308/10 |
| 3,565,495 | 2/1971 | Lyman | 308/10 |
| 3,650,581 | 3/1972 | Boden | 308/10 |
| 3,731,984 | 5/1973 | Habermann | 308/10 |
| 3,779,618 | 12/1973 | Soglia | 308/10 |

FOREIGN PATENTS OR APPLICATIONS
1,033,319   7/1958   Germany .............................. 308/10

*Primary Examiner*—R. Skudy
*Attorney, Agent, or Firm*—Craig & Antonelli

[57] ABSTRACT

A magnetic bearing of the radially facing type for a use with a rotatable body adapted to rotate at high velocity and for maintaining stable rotation of the body upon radial and longitudinal deflections of the body. The magnetic bearing device includes a rotatable member secured to the rotatable body and consisting of magnetic materials, stationary members disposed at upper and lower sides of the rotatable member and consisting of magnetic materials, two groups of teeth, each group having a plurality of opposing teeth formed respectively concentrically on opposing surfaces of the rotatable member and the stationary member with gaps defined between the opposing teeth of each group, and exciting coils for providing magnetic flux between the rotatable member and the stationary members such that at least one of the groups of teeth become magnetically saturated, whereby a supporting force for a contacting type bearing device disposed on a lower end portion of the rotatable body is relieved.

16 Claims, 3 Drawing Figures

MAGNETIC BEARING DEVICES

BACKGROUND OF THE INVENTION

The present invention relates to a magnetic bearing for a rotatable body, especially for a rotatable body utilized as an apparatus for the separation of mixtures of gases.

Mechanical bearings decrease their supportable forces even upon an occurrence of a slight release of contact between a rotating surface and a journal surface, namely they have a property of high rigitity. On the other hand, magnetic bearings may maintain their magnetic forces constant against large deflections of rotatable bodies, namely they have a property of low rigitity. In accordance with the property, the magnetic bearings may settle critical speeds at an extremely low velocity in comparison with the mechanical bearings, so that it is easy to pass the critical speeds. Accordingly, the magnetic bearings are useful fo r journalling bodies which rotate at high speed. Additionally, and since the magnetic bearings can easily adjust their magnetic force by control of an electric current of the energizing solenoids, the magnetic bearings may generate a property which is not achieved by mechanical bearings through detecting the deflections of the bodies and controlling the electric current for the exciting coils by the detected signal.

Thus, a thrust magnetic bearing is utilized for receiving thrust and a facing type magnetic bearing is utilized for restoring the rotatable body to the original position, when a radial deflection of the rotatable body appears. The thrust magnetic bearing is of type having exciting coils disposed in a stator iron core and a rotatable member is positioned in the center of the stationary members of the stator iron core to provide narrow gaps between the rotatable member and the stationary members. Accordingly, in the magnetic bearing of this type the excitation of the exciting coils generates magnetic flux, whereby the rotatable member is given axial absorbent force to become axially stable at any position, but against radial deflections of the rotatable body for increasing absorbent force in the direction of the deflection and for decreasing absorbent force in the opposite direction thereof such that the rotatable member becomes extremely unstable.

Since the facing type magnetic bearing has a lower iron core secured on a part of a rotatable body and has a fixed upper iron core installed in opposition to the lower iron core, and the upper iron core is arranged so as to be excited by exciting coils, radial unstability which is a defect of the thrust magnetic bearing is prevented. The facing type magnetic bearing, however, has instability in the axial direction in order to increase the absorbent force, when axial deflections have occurred, such that the both iron cores approach each other and in order to decrease absorbent force when the deflections have occurred, such that the both iron cores must move away from each other.

In the thrust magnetic bearing and the facing magnetic bearing in order to improve the absorbent force a plurality of teeth have been formed on portions where the magnetic lines of force pass. A device has been proposed having a construction in which the same number of teeth are concentrically formed on each opposite surface of a rotatable member and a stationary member. As the centripetal force is proportional to the permeance change of magnetic circuits, it is known to make the teeth as thin as possible to increase the centripetal force. In the magnetic circuits which have such a device, when the total amount of surface area in the tips of each group of the teeth formed on the rotatable member and the stationary member is represented by S, and axial absorbent force $Ft$ is as follows:

$$Ft \; \alpha \; B^2 S = B \phi$$

where $B$ is flux density and $\phi$ is the total amount of magnetic flux.

When there are upper and lower stationary members disposed on both sides of a rotatable member providing predetermined gaps between the stationary members and the rotatable member, and the number of teeth and the configuration of the teeth are entirely identical, only the centripetal force acts and the effects of the absorbent forces generated on the rotatable member compensate each other. However, when the rotatable member slightly deflects upwardly or downwardly so as to narrow the gaps, an absorbent force between the opposing teeth in the direction of the deflection increases and an absorbent force in the direction of the reverse thereof decreases. As indicated by the above formula, the absorbent force $Ft$ increases or decreases along a curve of second degree, so that even a slight deflection prevents smooth rotations of the rotatable body secured to the rotatable member. Furthermore, recent progress has been made in the development of a high speed rotatable body which requires the rotation above 30,000 RPM. Such an apparatus requires a radially and axially stable magnetic bearing device.

SUMMARY OF THE INVENTION

An object of the present invention is to provide a magnetic bearing device which not only maintains the proper centripetal force for a rotatable body but also which provides stable performance against the axial deflections of the rotatable body.

Another object of the invention is to provide a magnetic bearing device which acts to relieve a supporting force of another bearing device supporting the same rotatable body by giving the rotatable body a thrust during operation.

A further object of the invention is to provide a magnetic bearing device having axially stable performance, when the device is used widely in the axially movable range of the rotatable body.

A still further object of the invention is to provide a magnetic bearing device having a small changing rate of thrust against an axially constant deflection of the rotatable body.

The present invention has taken into consideration that in a magnetic bearing device axial thrust is in proportion to the product of flux density between opposing surfaces of the rotatable and stationary members and the amount of magnetic flux is given in the above-mentioned formula. In accordance with the present invention a magnetic bearing device comprises stationary members at both sides of a rotatable member, a plurality of teeth respectively formed on surfaces of the stationary members and the rotatable member, thereby defining two groups of an upper plurality of teeth and lower plurality of teeth respectively, and predetermined gaps between the opposing teeth wherein at least one of the groups thereof is arranged to be magnetically saturated. More particularly the invention provides a magnetic bearing device including a rotatable member secured to a rotatable body and consisting of magnetic materials, stationary members disposed at both sides of the rotatable member and consisting of magnetic materials, first and second groups of teeth, each group providing a plurality of opposing teeth formed respectively concentrically on opposing surfaces of the rotatable member and the stationary member with gaps defined between the opposing teeth of each group, and means for providing magnetic paths between the rotatable member and the stationary members through one of the groups having the lesser number of teeth, whereby at least the teeth of such group are magnetically saturated.

These and further objects, features and advantages of the present invention will become more obvious from the following description when taken in connection with the accompanying drawings which show, for purposes of illustration only, several embodiments in accordance with the present invention.

DESCRIPTION OF THE PREFERRED EMBODIMENT

Figure 1:
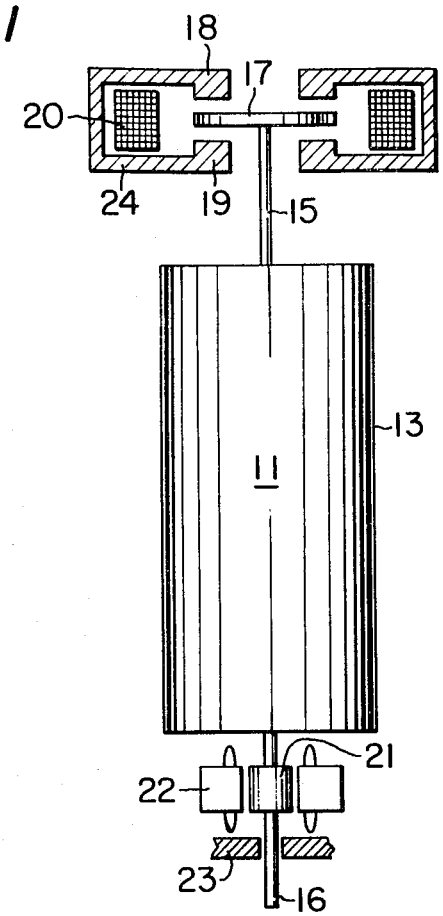
FIG. 1 discloses a centrifugal separator of a conventional type that may be employed advantageously in the rotatable body rotating at high speed.

Referring now to the drawings, wherein like reference numerals are utilized to designate like parts throughout the several views, there is shown in FIG. 1 a rotatable body 11 including a rotating drum 13, upper and lower shafts 15, 16 mounted on the drum 13 with a rotor 21 of an electrical driving motor being secured on the lower shaft 16. A magnetic bearing device including a circular rotatable member 17 having a disk shape secured on the upper shaft 15, upper and lower stationary annular members 18, 19, exciting coils 20, and an iron core 24. The upper and lower stationary members are arranged so that a portion of the rotatable member is positioned between opposite surfaces thereof and are incorporated with the iron core 24 in a body. The iron core and the exciting coils are arranged to provide a thrust force on the rotatable member. The lower shaft 16 is supported by a contacting type bearing 23. Accordingly, the rotatable body 11 is supported by the magnetic bearing device and the contacting type bearing for rotation thereof. A stator 22 of the driving motor is disposed about the rotor 21 and the rotatable body is permitted to rotate at high speed through operation of the driving motor.

Figure 2:
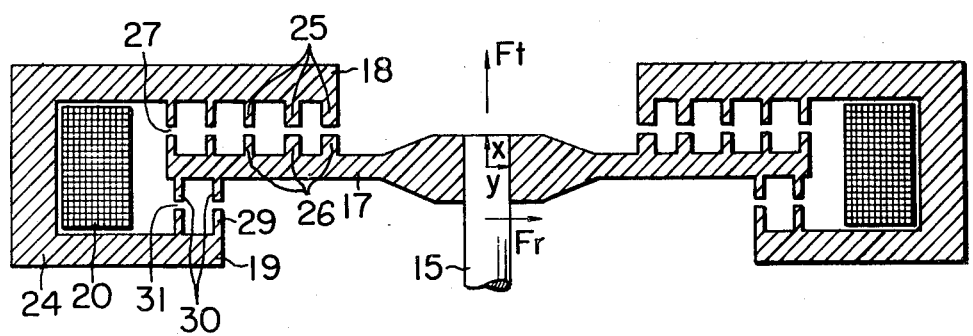
FIG. 2 is a vertical sectional view of an embodiment of a magnetic bearing device according to the present invention.

FIG. 2 discloses in detail the magnetic bearing device of the facing type in FIG. 1 in accordance with the present invention. A plurality of concentrically arranged teeth 25,26 are cylindrically mounted on the opposing surfaces of the circular rotatable member 17 and the annular stationary member 18 respectively whereby the teeth 25,26 define an upper group of teeth. A predetermined gap 27 is formed between the teeth 25,26. The teeth are in the form of rings or are formed as individual teeth spaced along concentric circular paths. Vertical sections of the teeth are rectangular and the opposing teeth are arranged to provide magnetic paths.

The tips of the teeth usefully act for producing thrust with the tips gradually increasing in area from the outer teeth to the inner teeth. Alternatively, the areas of the different teeth may be the same. The configuration of a tooth is not restricted to the illustrated rectangular configuration and a section of a tooth may be trapezoidal wherein the tip is shorter than the root portion thereof or an inverse trapezoid wherein the tip is longer than the root portion.

A plurality of concentric teeth 29,30 are also cylindrically mounted on the opposing surfaces of the circular rotatable member 17 and the annular stationary member 19. The teeth 29,30 define a lower group of teeth and a predetermined gap 31 is formed between the teeth 29,30. The configuration of a tooth of the lower group is substantially identical with the tooth configuration of the upper group. The teeth 29,30 are disposed on the outer side with respect to member 17 to increase the centripetal force and magnetic paths may be formed between the opposing teeth 29 and 30. The number of teeth 29,30 in the lower group is less than that of teeth 25,26 in the upper group and area of the tips are the same. Alternatively, the number of teeth of the lower group may be the same as the teeth 25,26 with the amount of area at the tips of the teeth of the lower group smaller than that of the teeth 25,26. Accordingly, the teeth 29,30 are apt to be magnetically saturated as compared with the teeth 25,26.

The flux density in the teeth 25,26,29,30 is adjusted by controlling the current for the exciting coils 20 and when the flux density is over a predetermined value, the teeth 29,30 become saturated in advance of saturation of the teeth 25,26. Additionally, leak magnetism from side surfaces of the teeth 25,26 increases. The exciting coils 20 are not required to be of an adjustable type and identical effects are attained by using a preset value of current.

Figure 3:
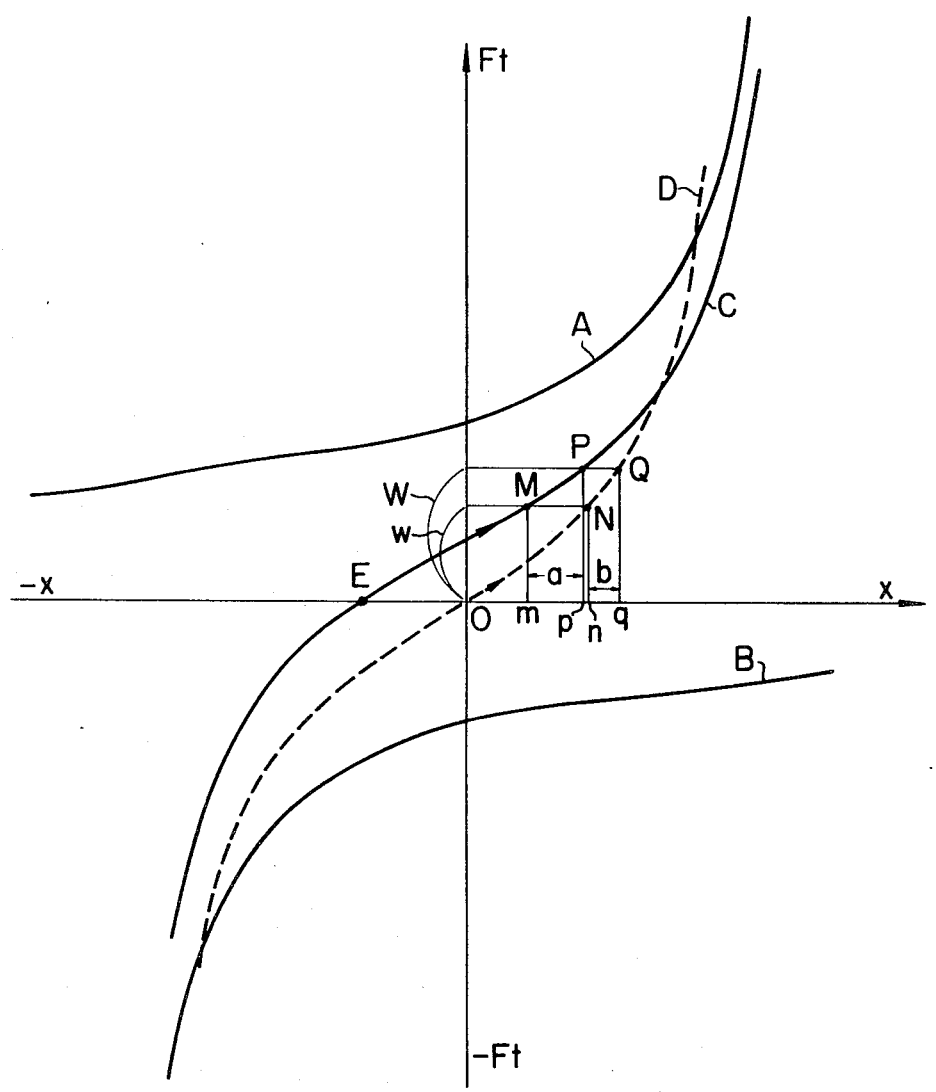
FIG. 3 is a graph illustrating the performance characteristics of the present invention.

While the magnetic saturation in the teeth 29,30 is produced in the manner indicated above, a thrust curve acting between the teeth 25,26 which are not magnetically saturated is represented by the curve A in FIG. 3 and a thrust curve acting between the teeth 29,30 is represented by the curve B, whereby a thrust curve acting on the rotatable member 17 is represented by the curve C as shown in FIG. 3. The ordinate in FIG. 3 represents $Ft$, the upward absorbing force of the rotatable body and the abscissa represents X, the amount of deflection in the upward direction.

In FIG. 3, the curve D illustrates the thrust of a prior art radially facing type bearing in which a plurality of teeth are entirely symmetrically installed with upper and lower gaps 27,31.

When the upward thrust represented by $w$ is produced on the rotatable member for relieving a load of the contacting type bearing, the point M is positioned on the curve C and on the contrary the point N is positioned on the curve D, so that the deflections in $x$-distance respectively becomes $m,n$. Since the upward absorbent force should be smaller than the total weight W of the rotatable body, as is evident from the drawing the upwardly movable extent is $\overline{MP}$ about the curve C, whereby the deflection in $x$-distance becomes $\overline{mp}=a$, and the other extent is $\overline{NQ}$ about the curve D, whereby the deflection therein becomes $\overline{nq}=b$. As shown, $a > b$. Accordingly, the movable extent referring to the curve C is wider than that of the curve D. It is obvious that a device having a wider extent of movement provides superior stability. Furthermore, the changing rates of the thrust in the neighborhood of the points M,N are represented by the inclination of the curves. As is evident from FIG. 3 the inclination of the curve C in the neighborhood of the point M is less than that of the curve D in the neighborhood of the point N. Accordingly, the curve C illustrates superior performance characteristics. Additionally, in the case that the rotating drum 13 as shown in FIG. 1 is barrel-shaped with advance of speed thereof such that downward deflection of the rotatable member 17 occurs, the upward absorbent force, however, is acting on the rotatable member 17 to the extent representative by the point E on the abscissa and the intersection of the curve C. Accordingly, the device according to the present invention also provides stable performance against the deflections of −x.

When the other end portion of the rotatable body is supported by a contacting type bearing, for example, a ball bearing type as shown in FIG. 1, the load of the bearing 23 is relieved by producing the absorbent force during operation. Thus, speeding up of the rotatable body is easily achieved and the improvement of the bearing 23 with regard to loss and the length of service life occurs. It is well-known that the radially facing type magnetic bearing has a stable performance in the radial direction (the direction of y in FIG. 2). The absorbent force Fr (the centripetal force) is shown by a following formula, when the permeance is represented by P and magnetomotive force is represented by V;

$$Fr = V^2 \frac{dP}{dy}$$

It is necessary to take a large changing rate of the permeance against the radial deflections for obtaining radial large force Fr. In the invention as shown in FIG. 2 a plurality of teeth 25,26,29,30 are formed, so that a large changing rate of the permeance is provided. Further, Fr is effected by the height of the teeth, namely the depth of grooves, the width of the teeth, dimension of pitches of the teeth and the dimension of the gaps 27,31 between the rotatable member 17 and the stationary members 18,19.

Obviously, many modifications and variations of the present invention are possible in the light of the above teachings. It should therefore be understood that within the scope of the appended claims, the invention may be practiced otherwise than as specifically described.

We claim:

1. A magnetic bearing device comprising a rotatable member secured to a rotatable body for rotation therewith, said rotatable member being formed of a magnetic material and having first and second oppositely facing surface portions, stationary member means formed of a magnetic material and having surface portions disposed in opposing relation to the first and second surface portions of said rotatable member, first and second groups of teeth, each of said groups of teeth including a plurality of opposing teeth formed respectively along concentric paths on opposing surfaces of said rotatable member and said stationary member means with gaps being provided between the opposing teeth of each of said groups, and means for providing magnetic paths between said rotatable member and said stationary member and adapted to magnetically saturate the teeth of said groups, one of said first and second groups of teeth being arranged to become magnetically saturated before the other of said first and second groups of teeth, said one of said first and second groups of teeth having a fewer number of teeth than said other of said first and second groups of teeth.

2. A magnetic bearing device comprising a rotatable member secured to a rotatable body for rotation therewith, said rotatable member being formed of a magnetic material and having first and second oppositely facing surface portions, stationary member means formed of a magnetic material and having surface portions disposed in opposing relation to the first and second surface portions of said rotatable member, first and second groups of teeth, each of said groups of teeth including a plurality of opposing teeth formed respectively along concentric paths on opposing surfaces of said rotatable member and said stationary member means with gaps being provided between the opposing teeth of each of said groups, and means for providing magnetic paths between said rotatable member and said stationary member and adapted to magnetically saturate the teeth of said groups, one of said first and second groups of teeth being arranged to become magnetically saturated before the other of said first and second groups of teeth, said teeth of said one of said first and second groups of teeth being provided with predetermined surface portions which are smaller in area than the predetermined surface portions of said teeth of said other of said first and second groups of teeth.

3. A magnetic bearing device according to claim 2, wherein the predetermined surface portions are narrowed portions of said teeth.

4. A magnetic bearing device according to claim 3, wherein the narrowed portions are provided at the tips of said teeth.

5. A magnetic bearing device according to claim 2, wherein said plurality of teeth of each of said groups are formed as concentric circular rings on the opposing surfaces of said rotatable member and said stationary member means, each of the opposing teeth being provided with a substantially planar surface at the tip thereof.

6. A magnetic bearing device according to claim 2, wherein said rotatable member is disk-shaped and said stationary member means includes first and second annular members disposed on opposite sides of said rotatable member.

7. A magnetic bearing device according to claim 2, wherein the rotatable body is vertically disposed for rotation and said magnetic bearing device is vertical magnetic bearing device having said rotatable member secured at the upper end portion of said rotatable body, the first and second oppositely facing surfaces of said rotatable member being upper and lower side surfaces of said rotatable member, said magnetic bearing device providing a force for relieving a supporting force for a contact type bearing device disposed on the lower end portion of the rotatable body.

8. A magnetic bearing device according to claim 7, wherein said rotatable member is disk-shaped and said stationary member means include first and second annular members disposed on opposite sides of said rotatable member, said teeth of said one of said first and second groups being disposed at the outer portions of said rotatable member as compared with said teeth of said other of said first and second group.

9. A magnetic bearing device according to claim 8, wherein said teeth of said other of said first and second groups are disposed at outer and inner portions of said rotatable member.

10. A magnetic bearing device according to claim 7, wherein said one of said first and second groups is the group of teeth disposed at the lower side of the rotatable member.

11. A magnetic bearing device according to claim 2, wherein said means for providing magnetic paths include exciting coil means and said stationary member means includes first and second annular members disposed on opposite sides of said rotatable member and a member interconnecting said annular members and partially surrounding said exciting coil means.

12. A magnetic bearing device comprising a rotatable member secured to a rotatable body for rotation therewith, said rotatable member being formed of a magnetic material and having first and second oppositely facing surface portions, stationary member means formed of a magnetic material and having surface portions disposed in opposing relation to the first and second surface portions of said rotatable member, first and second groups of teeth, each of said groups of teeth including a plurality of opposing teeth formed respectively along concentric paths on opposing surfaces of said rotatable member and said stationary member means with gaps being provided between the opposing teeth of each of said groups, and means for providing magnetic paths between said rotatable member and said stationary member and adapted to magnetically saturate the teeth of said groups, one of said first and second groups of teeth being arranged to become magnetically saturated before the other of said first and second groups of teeth, said plurality of teeth of each of said groups including a plurality of individual teeth arranged along concentric circular paths.

13. A magnetic bearing device comprising a rotatable member secured to a rotatable body for rotation therewith, said rotatable member being formed of a magnetic material and having first and second oppositely facing surface portions, stationary member means formed of a magnetic material and having surface portions disposed in opposing relation to the first and second surface portions of said rotatable member, first and second groups of teeth, each of said groups of teeth including a plurality of opposing teeth formed respectively along concentric paths on opposing surfaces of said rotatable member and said stationary member means with gaps being provided between the opposing teeth of each of said groups, and means for providing magnetic paths between said rotatable member and said stationary member and adapted to magnetically saturate the teeth of said groups, one of said first and second groups of teeth being arranged to become magnetically saturated before the other of said first and second groups of teeth, the rotatable body being vertically disposed for rotation and said magnetic bearing device being a vertical magnetic bearing device having said rotatable member secured at the upper end portion of said rotatable body, the first and second oppositely facing surfaces of said rotatable member being upper and lower side surfaces of said rotatable member, said magnetic bearing device providing a force for relieving a supporting force for a contact type bearing device disposed on the lower end portion of the rotatable body, said rotatable member being disc-shaped and said stationary member means including first and second annular members disposed on opposite sides of said rotatable member, said teeth of said one of said first and second groups being disposed at the outer portions of said rotatable member as compared with said teeth of said other of said first and second group, said teeth of said first and second groups having the area of the tips thereof gradually increased in area in the direction from an outer tooth to an inner tooth.

14. A vertical magnetic bearing device including a rotatable member secured to an upper portion of a vertically disposed rotatable body for rotation therewith, said rotatable member being formed of a magnetic material and having upper and lower side portions, stationary member means disposed at the upper and lower side portions of said rotatable member and formed of a magnetic material, upper and lower groups of teeth, each of said groups including a plurality of opposing teeth formed respectively in concentric paths on opposing surfaces of said rotatable member and said stationary member means with gaps being provided between the opposing teeth of each of said groups, and means for providing magnetic paths between said rotatable member and said stationary member means such that at least the teeth of one of said groups become magnetically saturated whereby the magnetic bearing device provides a force for relieving a supporting force for a contact type bearing device disposed at the lower portion of the rotatable body, the teeth of the at least one group which becomes magnetically saturated being disposed at outer portions of said rotatable member and said stationary member means as compared with the teeth of the other of said groups, the tips of the teeth of said groups being gradually increased in area in the direction, from an outer tooth to an inner tooth.

15. A vertical magnetic bearing device according to claim 14, wherein the teeth of the at least one group which becomes magnetically saturated are disposed at outer portions of said rotatable member and said stationary member means as compared with the teeth of the other of said groups, each of the teeth having a substantially planar surface at the tip thereof.

16. A vertical magnetic bearing device including a rotatable member secured to an upper portion of a vertically disposed rotatable body for rotation therewith, said rotatable member being formed of a magnetic material and having upper and lower side portions, stationary member means disposed at the upper and lower side portions of said rotatable member and formed of a magnetic material, upper and lower groups of teeth, each of said groups including a plurality of opposing teeth formed respectively in concentric paths on opposing surfaces of said rotatable member and said stationary member means with gaps being provided between the opposing teeth of each of said groups, and means for providing magnetic paths between said rotatable member and said stationary member means such that at least the teeth of one of said groups become magnetically saturated whereby the magnetic bearing device provides a force for relieving a supporting force for a contact type bearing device disposed at the lower portion of the rotatably body, the teeth of the at least one group which becomes magnetically saturated being disposed at outer portions of said rotatable member and said stationary member means as compared with the teeth of the other of said groups, the tips of the teeth of said groups being gradually narrowed in area in the direction from an inner tooth to an outer tooth.

* * * * *